United States Patent [19]
Zaremba

[11] Patent Number: 6,108,971
[45] Date of Patent: Aug. 29, 2000

[54] PANEL PLANTER

[76] Inventor: George Julian Zaremba, 4229 N. Honore, Chicago, Ill. 60613

[21] Appl. No.: 09/196,704

[22] Filed: Nov. 20, 1998

Related U.S. Application Data

[63] Continuation-in-part of application No. 08/679,420, Jul. 8, 1996, Pat. No. 5,887,384.

[51] Int. Cl.[7] .................................................. A01G 9/02
[52] U.S. Cl. ............................................. 47/65.5; 47/68
[58] Field of Search ............................ 47/39, 40, 65.5, 47/66.1, 68

[56] References Cited

U.S. PATENT DOCUMENTS

| | | | |
|---|---|---|---|
| 4,559,738 | 12/1985 | Helfman | 47/66.1 |
| 4,640,045 | 2/1987 | Nesbitt et al. | 47/39 X |
| 4,698,936 | 10/1987 | Helfman | 47/40 X |
| 4,897,958 | 2/1990 | Brydges | 47/68 |
| 5,177,899 | 1/1993 | Powell | 47/65.5 |
| 5,368,266 | 11/1994 | Allen | 47/39 X |
| 5,664,367 | 9/1997 | Huang | 47/40 |
| 5,887,384 | 3/1999 | Zaremba . | |

*Primary Examiner*—John A. Ricci
*Attorney, Agent, or Firm*—Adrienne B. Naumann

[57] ABSTRACT

A planter box for installation on the top of a narrow horizontal surface includes a lower surface with at least one recessed depression. Each depression comprises serrations around its periphery. A rectangular connector with serrations complementary to the serrations of a respective depression and a downwardly depending peg, is frictionally inserted in each depression. In this manner, when the box rests on the top of the panel, one peg extends downwardly in close relation, but not contacting the panel. A wedge member is provided for each peg, each wedge member including a block with a friction surface to contact a respective wall member side, and a slanted slot to receive a respective peg. As each wedge member slides along a respective peg in a direction parallel to the panel top, the friction surface of each wedge member will be brought into frictional contact with a respective panel side to hold the planter box in place.

14 Claims, 11 Drawing Sheets

TABLE (IN INCHES)

1A.....1      - 1 1/4
1B.....1 1/4 - 1 3/8
2B.....1 3/8 - 1 1/2
2C.....1 1/2 - 1 3/4
3C.....1 3/4 - 1 7/8
3D.....1 7/8 - 2 1/8
4D.....2 1/8 - 2 1/4
4E.....2 1/4 - 2 1/2
5E.....2 1/2 - 2 3/4
5F.....2 3/4 - 2 7/8
6F.....2 7/8 - 3 1/8
6G.....3 1/8 - 3 1/4
7G.....3 1/4 - 3 1/2
7H.....3 3/8 - 3 5/8
8H.....3 5/8 - 3 3/4
8I......3 3/4 - 4
9I......3 7/8 - 4 1/8
9J......4      - 4 1/4
10J.....4 1/4 - 4 3/8

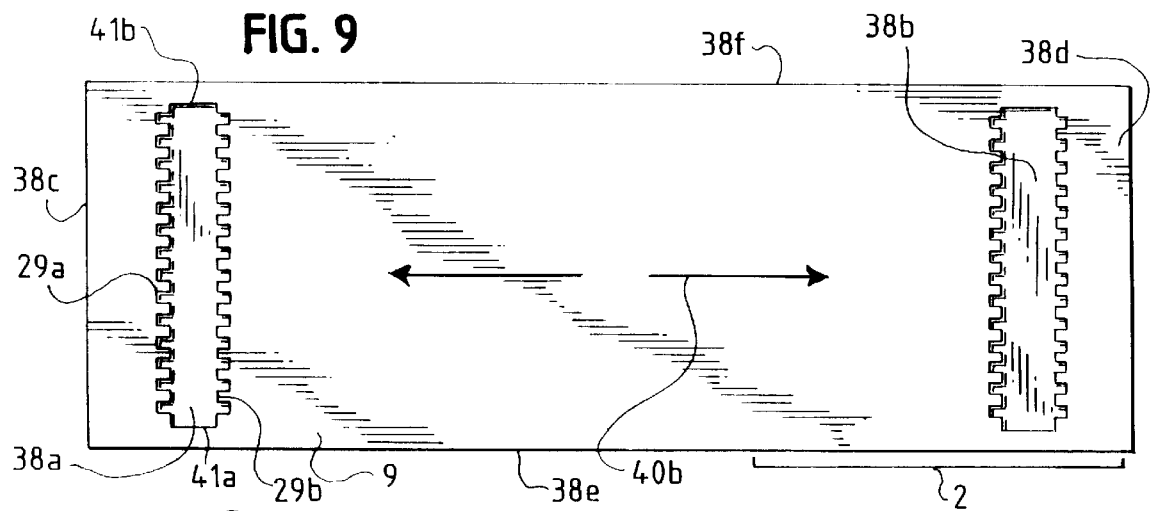
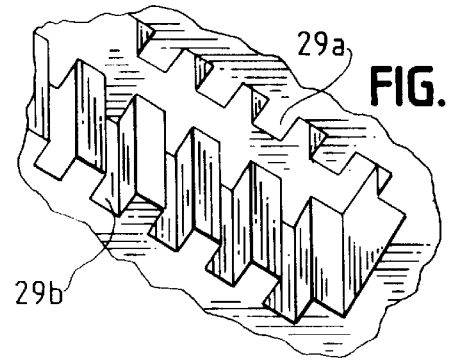
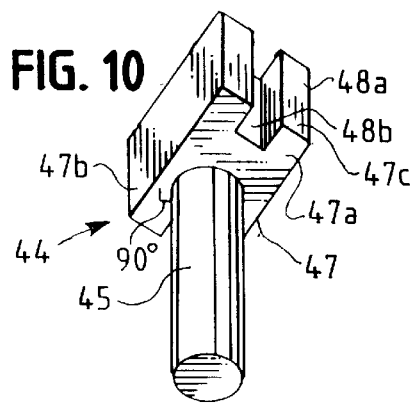
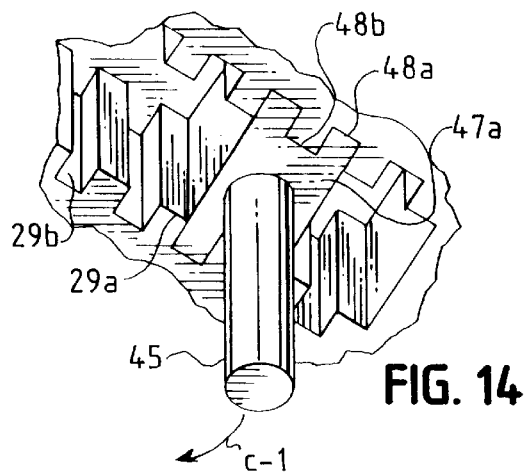
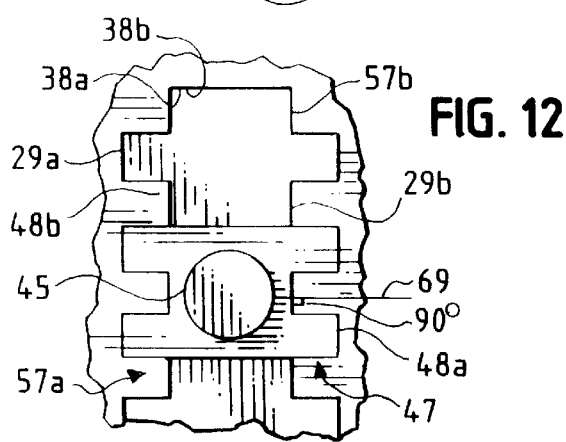
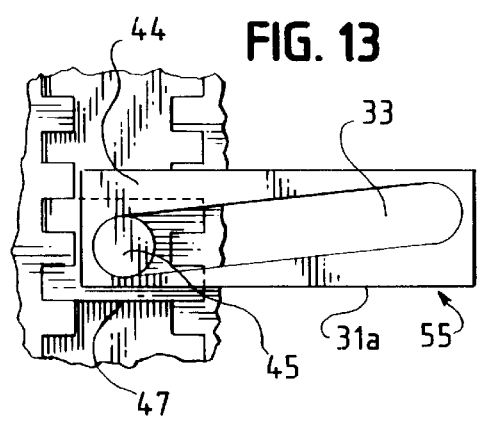

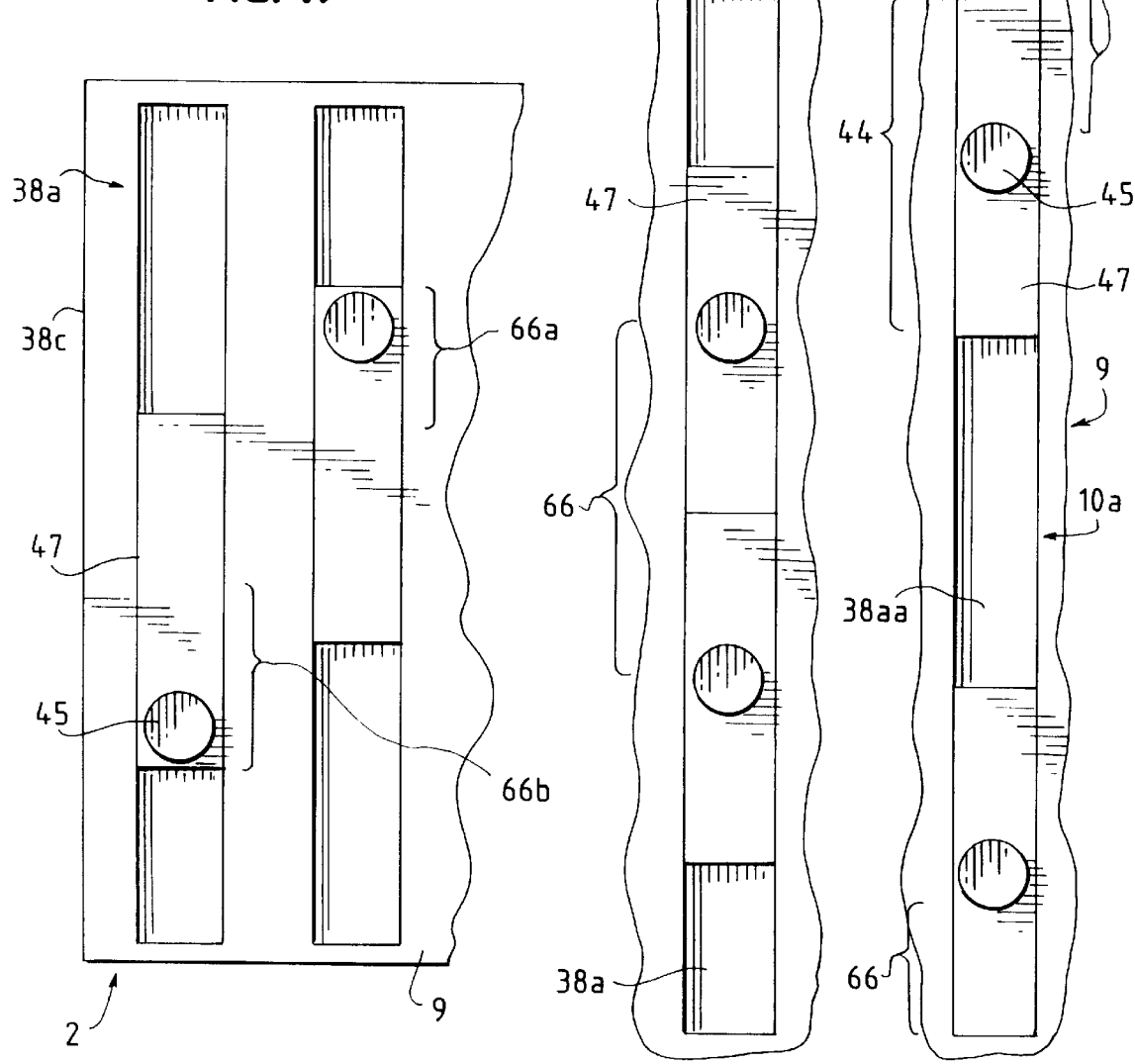

FIG. 22
FIG. 21
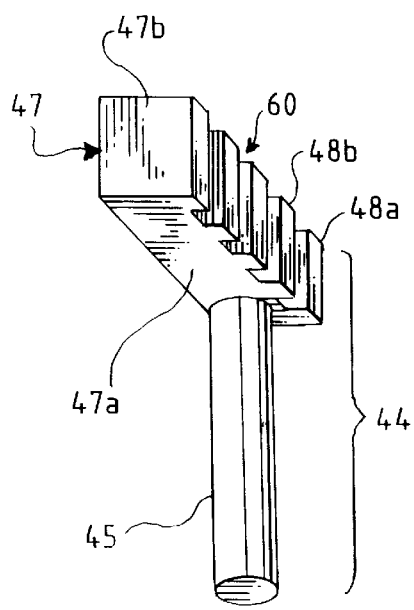
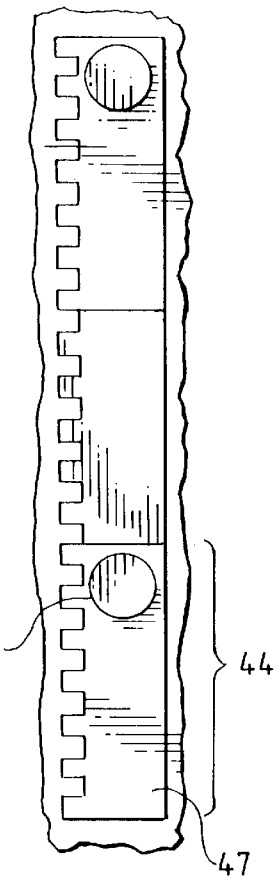
FIG. 23
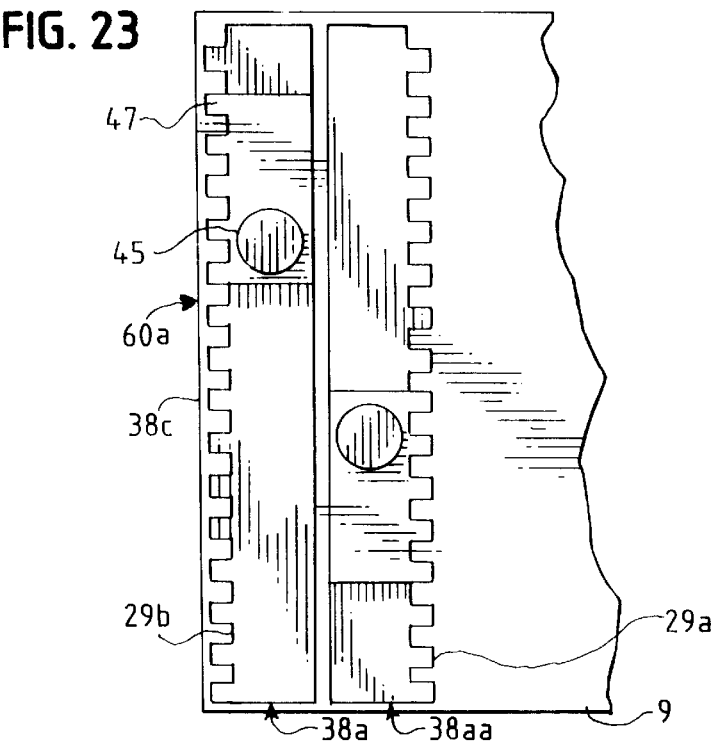

PANEL PLANTER

BACKGROUND OF THE INVENTION

This application is a continuation in part of application Ser. No. No. 08/679,420, now U.S. Pat. No. 5,887,384, filed Jul. 8, 1996.

My invention relates to a structure which functions as an elevated stand and container for floral arrangements and plants. More particularly, the present invention, hereinafter referred to as the panel planter, relates to a box which holds flower or plant arrangements while reversibly fastened to the top of a, for example, free standing wall panel, room partition, or any generic wall member. In the preferred embodiment the box interior contains circular raised areas on which to place potted plants, so they can drain properly after being watered. However, these features are not a requirement and objects other than plants and flowers can be placed in the box.

There has been a long-standing need in the floral industry for a modular flower or plant display stand for indoor and outdoor environments. My panel box is easily engaged by a wedge and peg attachment mechanism or a peg-base, so it is easily moved from panel to panel. There are also constraints of weight, costs and rigidity of existing planters and boxes which cannot easily be moved, grouped or rearranged individually within practical cost and time constraints.

My panel planter is easily engaged by devices, hereinafter referred to as attachments or peg wedges, further comprised of wedge members and peg members. Using these attachments or peg-bases, a planter box is easily tightened to fit the contour of any generic wall member.

Others have suggested numerous display devices for holding plants or flowers securely atop a fence or panel. For instance, U.S. Pat. No. 4,015,545 (Stankowitz) discloses a support bracket designed to be mounted between and supported by wall partitions. The support bracket is incapable of supporting anything except the lightest of objects, such that heavy plants could not be placed in the container.

U.S. Pat. No. 4,415,091 (Wolff) discloses a plurality of wall partitions joined together at their vertical edges. A beam member is supported at each of its end edges with a hanger which is inserted between the wall partitions where they join together. Various kinds of racks are designed to be securely suspended from one or more beams. However, the racks project a substantial distance from the partition walls and would make already crowded work conditions deteriorate.

U.S. Pat. No. 4,559,738 (Helfman) discloses three prototypes of a planter: (1) one which attaches to the top of a partition wall by a groove in the bottom surface of the planter; (2) one which attaches to the top by brackets; and (3) one which hangs from the partition by means of brackets or an extension of the planter designed to hook over the top of the partition wall.

However, the numerous prototypes of Helfman's brackets lack the flexibility, adaptability, and strength of my novel attachment. In the preferred embodiment my invention is comprised of two freely movable parts made of clear lucite or polyethylene. My invention comprises no brackets of any kind.

By locking a peg member or peg means into a wedge member, this unique structure, hereinafter referred to as the attachment, or peg-base. The attachment, or peg-base, in turn fits into serrated (comprised of ridges and valleys)areas within the bottom surface of the planter box floor. Four of such attachments, when strategically placed in the preferred embodiment, can grasp the top of any wall member, such as a railing, partition, or shelf. However, for an elongated or differently shaped planter, more or fewer attachments or peg-bases are within the scope of this invention.

My panel planter is rigidly fastened, but it can be easily removed and relocated. In the preferred embodiment of my panel box is economical, being made of lightweight plastic and clear rigid polypropylene attachments. However, other materials are suitable, such as plastics, wood and metals. These materials are also within the scope of my invention, especially for use of the panel planter in an outdoor environment.

None of the foregoing prior art structures have attachments, comprising peg members/peg means and wedge means, which easily and rigidly support a series of flower pots upon a panel or fence or other wall member. With my invention, the rectangular box can hold several flower or plant arrangements in a leakproof, watertight manner. My box also allows drainage so that roots emanating from the holes at the bottom of flower pots can reach the appropriate level of moisture. Alternatively, the box can be filled with soil or water and the plants and/or flowers need not be confined to pots.

As an optional feature, there is a specially graded circular template system for serrated depressions which are circular in shape. This template system correlates the orientation of the attachments to the width of the wall member.

In sum, coding templates for positioning the attachments, although optional, are also within the scope of my invention. The templates correspond to serrations(ridges and valleys), on the lower surface of the planter box. The coding system of the templates brings the attachments to within approximately one eighth of an inch of a respective side of a wall member.

The attachments or peg-bases are easily adjustable to any width for a surface of a wall member: between approximately four and one quarter inches and approximately one and one quarter inches in the preferred embodiment.

SUMMARY OF INVENTION

To solve this long-standing problem in the art, the present invention, hereinafter referred to as 'the panel planter,' provides at least two improved attachment devices for plant boxes. Use of these devices is appropriate along top surfaces of porch banisters, indoor movable wall panels, or other wall members.

An operator can manually arrange flowers, plants, and other decorations in separate pots, place them in the box and assemble the attachment devices quickly. The attachments, in the preferred embodiment, consist of plastic peg members and wedge members. Other embodiments use peg-bases with wedge members. The wedge members contain slanted slots in which peg members or peg-bases can easily slide and then tightly fit. Serrations (ridges and valleys) on the assembled attachment or peg-base fit into (serrations) ridges and valleys on the box's lower surface.

Accordingly, an object of my present invention is to provide an improved panel box that prevents slippage of the box when it is filled with plants and flowers.

Another object of my present invention is to provide an improved, stronger yet lightweight box made from durable low cost materials to support floral or plant arrangements, or in general to serve as a container.

Yet another object of the present invention is to provide at least four peg members and wedge members to form attachments which can be attached to the bottom surface of the box, using a template system.

Another object of the invention is to have a flat bottom of the planter box with circular raised areas so that pots may drain into the lower areas of the box.

Another object of the invention is to have additional supports for the pots along the floor of the box, constructed as raised plastic strips.

Another object of the invention is to create a planter which contains serrated (ridges and valleys) depressions on its bottom surface into which removable attachment devices can adjustably mechanically or frictionally interlock.

Another object of the invention is to create a planter box which uses plastic peg members or peg-bases which slidably fit into wedge members, forming attachments or attachment devices which grasp the sides of a wall member.

Yet another object of the invention is to create a planter box which uses modified peg members to slidably fit into serrated depressions.

Another object of the invention is to create a planter box with modified serrated depressions of different shapes and different peg-base designs which successfully fit a wall member.

These and still other objects and advantages of the invention will become apparent from the following description and drawings of the preferred embodiment and other prototypes.

BRIEF DESCRIPTION OF THE DRAWINGS

My invention may be better understood by reference to the drawings accompanying this specification:

FIG. 9 discloses the plan view of the lower surface of a planter box with rectangular serrated depressions.

FIG. 10 discloses a front prospective view of a serrated peg-base.

FIG. 11 discloses a partial perspective view of a rectangular depression segment with ridges and valleys (serrations).

FIG. 12 illustrates a plan closeup view of a rectangular depression segment and peg means.

FIG. 13 illustrates a plan view of a peg-base attached to a wedge member within a rectangular depression.

FIG. 14 discloses a modified peg member in a rectangular slot in partial perspective view.

FIG. 19 in plan view diagrammatically illustrates two paired rectangular depressions with staggered peg-bases.

FIG. 20 illustrates in plan view, a schematic representation of peg means at the center of each respective base means within two adjacent rectangular depressions.

FIG. 21 illustrates a peg-base with serrations on one side only of the base means.

FIG. 22 illustrates schematically, in plan view, two peg-bases within a rectangular depression with ridges and valleys on the same side as those of the peg-bases.

FIG. 23 illustrates a plan view of two adjacent rectangular depressions, each containing a peg-base with serrations (ridges and valleys) on one side only for a narrow wall member.

DETAILED DESCRIPTION OF THE INVENTION

Figure 1:
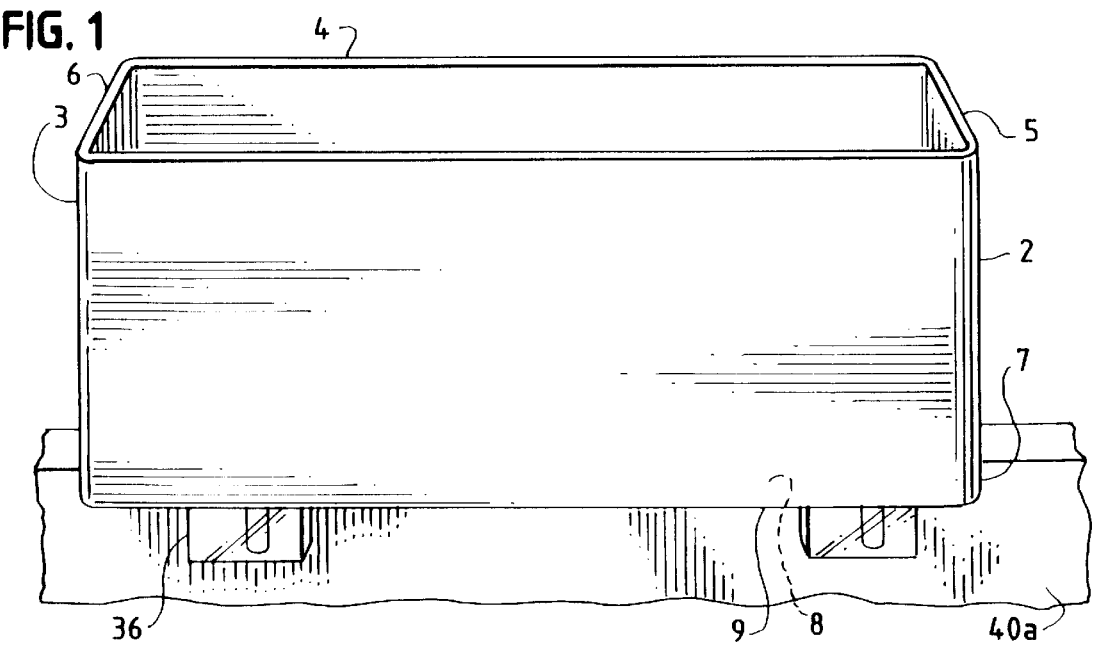
FIG. 1 is a front side view of the planter box with attachments.

My present invention, the panel planter 1, is actually a modified planter box 2 for rigid attachment to a wall member 40a. Such a wall member 40a has a top horizontal surface for an indoor room panel, railing or any other wall member for which a "flower box" is desired. In the preferred embodiment my planter box 2 is rectangular and slightly wider than the top horizontal surface of a wall member 40a with two respective sides. However, the scope of my invention includes other shapes and sizes for box component 2, as well other measurements for the width of any horizontal surface.

Major components of my invention 1 include: the unique attachment member 36, modified attachment 44 (peg-base), wedge members 31,31a and recessed areas 10a,38 with serrations 27,29 (comprising ridges 27a,29b and valleys 27a,29b). Areas in 10a,38 on bottom surface 9 of planter box 2 effectively interlock with serrations comprising peg means 30 or peg-base 44. However, any frictionally interlocking system on the bottom surface 9 is within the scope of my invention.

Recessed areas 10a,38 are located on bottom surface 9 of floor 7. Other attachments which frictionally fit into recessed areas (depressions) on bottom surface 9 are within the scope of my invention 1. Grooved or ribbed areas along bottom surface 9 with corresponding adjustable attachment devices are also within the scope of my invention 1.

My invention can include a coding system 37 with templates for determining the macrofit of box 2 to the width of the horizontal surface of a wall member 40a. However, this feature does not define or narrow the scope of my invention, and can be an optional feature.

My planter box 2, attachments 36, peg-bases 44 and wedge members 31,31a are generally made of plastic. However, my invention can be made of metal, synthetic resin or wood. If metal is used to make the planter, preferably a non-oxidizing metal is employed. Plastics that can be molded or die cast are preferred, such as acrylic, polystyrene, polyethylene, polyvinylchloride, polytetrafluoro-ethylene (teflon), polymethymethacrylate (plexiglas or lucite) polypropylene, or polycarbonate. Templates 37 can be paper, cloth, a similar light material, or engraved on bottom surface 9 of planter box 2.

Synthetic resins which are acceptable construction materials include nylon, rayon, dacron, formic, fiberglass, polyester, phenol formaldehyde, phenolfurfual, urea formaldehyde and the like. If wood is used, it should be coated with plastic or paint to prevent rot and retain moisture for the plants. A wood finish or a paper or fabric cover is also within the scope of my invention.

The plastic for attachments 36 can be lexan, although polystyrene is more economical. The attachments 36 in the preferred embodiment can also be made of lucite or solid acrylic. However, the most recommended materials for peg members 30 and peg means 45 are relatively harder plastic than for wedge members 31,31a, so they do not scratch and stick within wedge members 31, 31a. The most preferred plastic with respect to physical properties, for a peg member or peg means is clarified SAN (styrene acrylonitrile copolymer). The trademarked name for this particular grade of SAN by Dow is Tyril® 100. The address for Dow is:
P.O. Box 1206
Michigan 48641-1206.

A softer clarified plastic resin most recommended for comprising a wedge member 30,31a is a grade of generic K-resin with a chemical name of styrene-butadiene. This K-resin goes by the registered trademark Zytel® and is manufactured by:
Du Pont®
Du Pont Engineering Polymers
Chestnut Run Plaza 713
Wilmington, Del. 19805

The specific recommended grade is Zytel® 101. Its physical properties are listed in Exhibit B attached hereto and made an integral portion of this specification herein.

I. The Preferred Embodiment

Referring to FIG. 1, planter box 2 must be rigidly affixed so that it does not tip or fall, even if it is unevenly balanced by the contents. Box 2 will not slip and injure a person working beneath, for example, a panel component of a room.

Again referring to FIG. 1, in the preferred embodiment the planter box 2 in conjunction with attachments 36 comprise my invention 1. Another embodiment includes a template system 36, which is described infra.

In the preferred embodiment, the floral or plant arrangements are in pots which are placed directly inside rectangular box 2. The thickness of walls 3, 4, 5, 6, at right angles to a horizontal surface is approximately 0.15 inch. In the preferred embodiment the height of the upwardly protruding parallel walls comprising box 2 is approximately seven inches. The horizontal length of the longer walls is approximately 25 inches, and the width is approximately seven inches (two shorter walls). However, other dimensions and shapes are also within the scope of my invention.

Again referring to FIG. 1, floor 7 of box 2 rests upon the horizontal surface of wall member 40a. Floor 7 is approximately 0.15 inch in thickness(not including depression height). Floor 7 has an upper surface 8 and lower surface 9.

Figure 2:
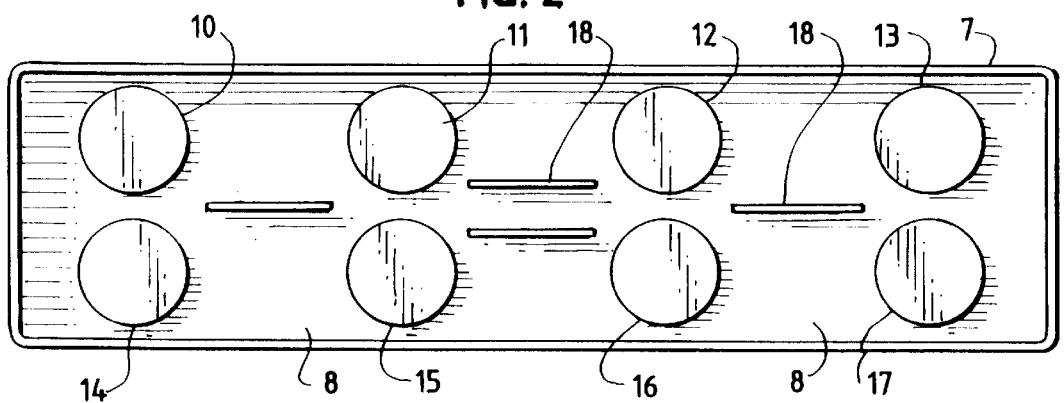
FIG. 2 is a plan view of an upper interior surface of a planter box with raised areas.

As shown in FIG. 2, in the preferred embodiment there are eight upwardly protruding raised circular areas specifically depicted as: 10, 11, 12, 13, 14, 15, 16, 17. These areas are injection molded with plastic on upper surface 8. These areas are approximately three inches in diameter and are arranged in two parallel rows of four each in the preferred embodiment. However, fewer or more, or absence of such circular areas are also within the scope of my invention. Such raised areas can also be of different shapes and dimensions.

In the preferred embodiment, between these circular areas are plastic strips 18. These strips are approximately three quarters of an inch in height and protrude upwardly from upper surface 8. In the preferred embodiment, there are five such strips, but more, fewer or no strips are within the scope of my invention.

Figure 3:
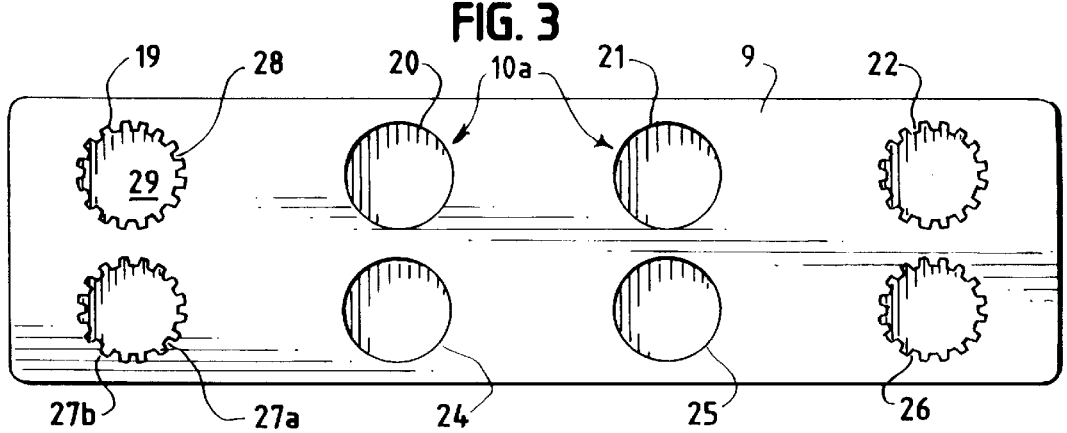
FIG. 3 is a plan view of the lower surface of a planter box with ridges and valleys (serrations) on the perimeters of four depressions.

Referring now to FIG. 3, in the preferred embodiment the lower surface 9 of box 2 comprises eight circular depressions. These depressions are generically referred to as 10a, and specifically illustrated as: 19, 20, 21,22, 23, 24, 25, 26. Depressions 10a are approximately three quarters of an inch in depth and approximately two and three quarters inches in diameter. Other depths, dimension shapes, and number of depressions can differ and remain within the scope of my invention.

Again referring to FIG. 3, in the preferred embodiment depressions 10a form two parallel lines and are also aligned in pairs. This allows wall member 40a to lie linearly between each pair of depressions 10a. Each of the two outer pairs of depressions 10a contain serrations 27 (ridges 27a and valleys 27b) as integral components of their circumferences.

Ridges 27a within each depression 10a are parallel to each other and reach from top edge 28 of each depression 10a to base 29, and at right angles to surface 9.

In the preferred embodiment the width of a single ridge 27a within a circular depression as described supra, is approximately one tenth of an inch. More than, or less than four serrated (ridges 27a and valleys 27b) areas, of different shapes and sizes are also within the scope of my invention. For example, an extremely elongated box may require all four pairs of circular depressions 10a be serrated(with ridges 27a and valleys 27b) to cooperate with additional attachments 36. Other numbers and/or combinations of serrated (ridges 27a and valleys 27b) and nonserrated depressions 10a are also within the scope of my invention.

Figure 4A:
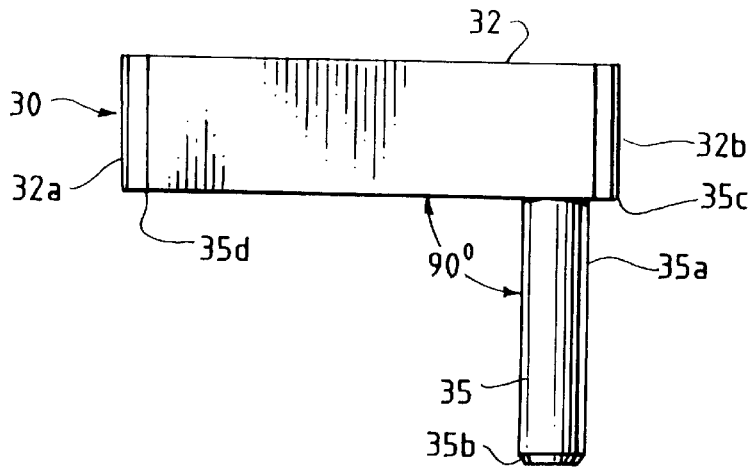
FIG. 4a is a side view of a peg member.

Referring now to FIG. 4a, peg member 30 in the preferred embodiment comprises a cylindrical rigid protruding component 35. Component 35 has an upper end 35a, which is fused at a right angle to a rigid rectangular straight segment 32. Component 35 also has a lower end 35b with a flat surface.

Figure 4B:
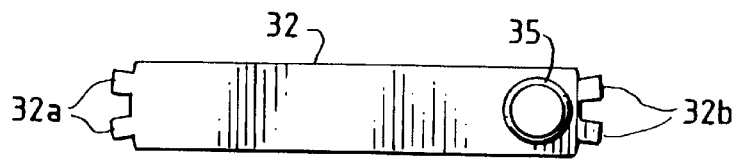
FIG. 4b is an upper plan view of a peg member with ridges and valleys.

Rectangular segment 32 has a first end 35c and a second end 35d, as seen in FIG. 4a. As seen in FIG. 4b, in the preferred embodiment there are two protruding ridges 32a and an additional two protruding ridges 32b at either end 35c,35d of straight rectangular segment 32.

In the preferred embodiment ridges 32a,32b on peg member 30 can interlock tightly with opposing serrations 27 (ridges 27a and valleys 27b) of depressions 10a. As mentioned supra, ridges 27a and valleys 27b are structurally part of circumferences of each depression 10a in lower surface 9. Please see FIG. 3. In other embodiments, serrations 27 integrally comprise the perimeters of other shaped depressions.

Figure 5A:
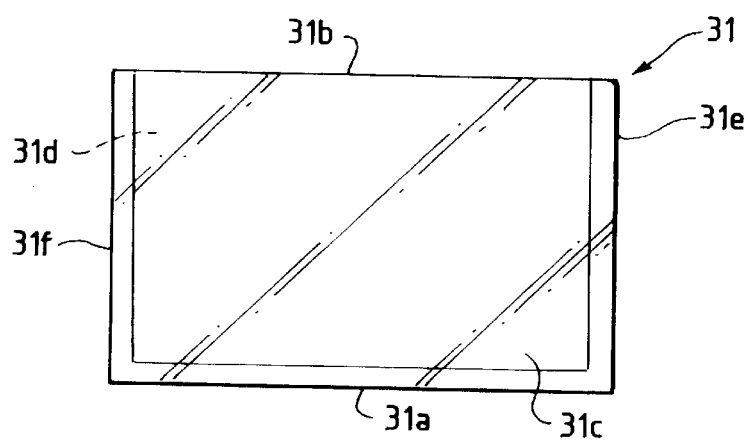
FIG. 5a is a side view of a wedge member.

Referring now to FIG. 5a, in the preferred embodiment wedge member 31 is approximately three quarters of an inch in width, approximately three inches in length and approximately one and three quarters inch in height. In the preferred embodiment there are: first and second sides 31e,31f, a bottom 31a, a top 31b, and third and fourth flat parallel sides 31c and 31d. The third flat side 31e is adapted to contact a respective side of wall member 40a.

Figure 5B:
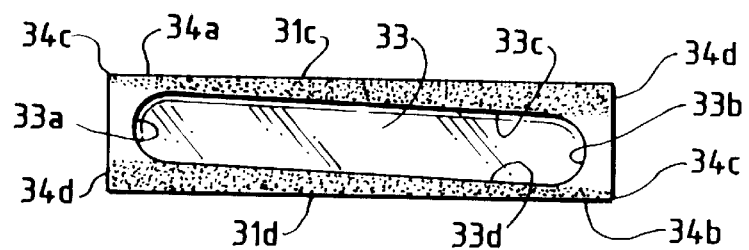
FIGS. 5b and 5c are plan views of two wedge members with each demonstrating a slanted slot.
Figure 5C:
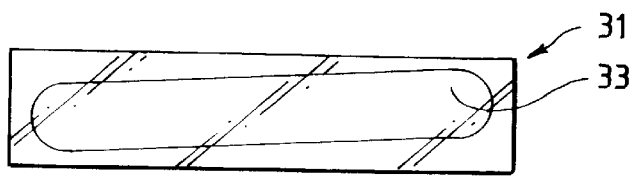

Referring to FIGS. 5b and 5c, wedge member 31 contains a slanted slot 33 with opposing ends 33a and 33b. In the preferred embodiment these ends are rounded. Slot 33 extends from slightly above bottom 31a and opens upwardly and exteriorly through top 31b.

Again referring to FIGS. 5b and 5c, slot 33 has two parallel opposing faces, 33c and 33d. Each of these two faces 33c and 33d, form one side of a wedge 34a or 34b. These wedges 34a and 34b are also delineated by sides 31c and 31d. In the preferred embodiment two wedges 34a, 34b, each having an apex 34c and a base 34d, are juxtaposed to each other on opposite sides of slot 33.

Figure 6A:
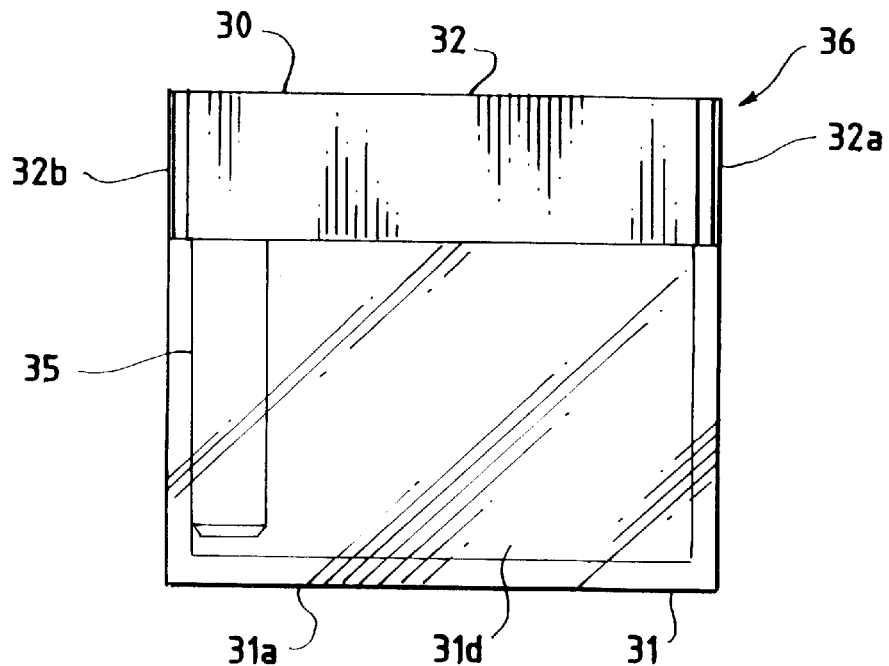
FIG. 6a is a direct side view of an attachment comprising a wedge member and a peg member.

As seen in FIG. 6a, in the preferred embodiment cylindrical rigid protruding component 35 fits firmly into slot 33 (not shown), thus forming attachment 36. However, cylindrical component 35 must not fit so tightly that wedge member 31 cannot slide easily from one end 33a to opposite end 33b. See FIG. 6b.

Figure 6B:
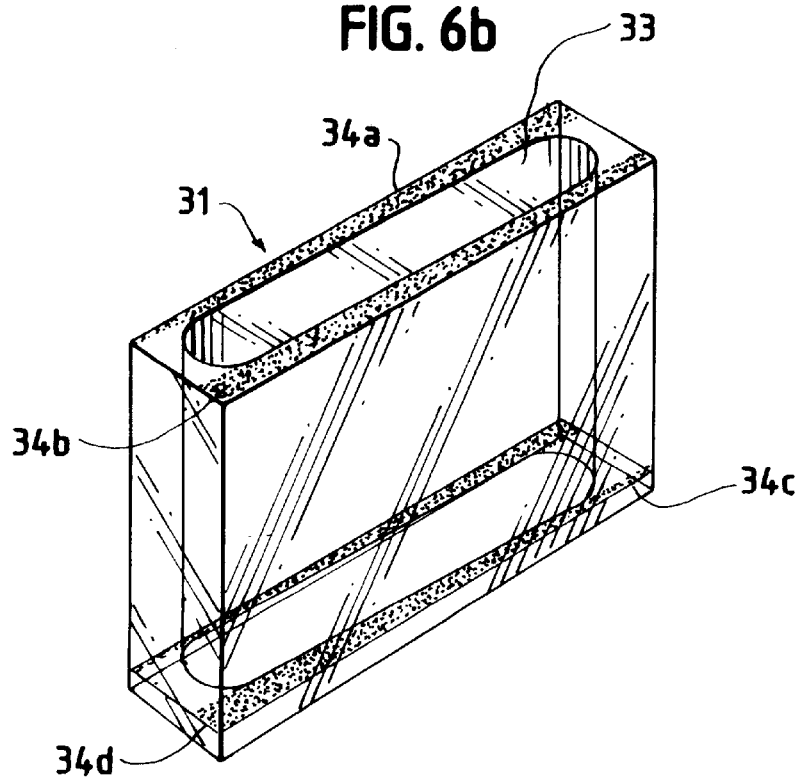
FIG. 6b is a three-quarters three-dimensional schematic view of a wedge member with a slot.

As shown in FIGS. 6b and 5b, in the preferred embodiment slot 33 has rounded ends 33a and 33b which can snugly accommodate a cylindrical protruding component 35. Rigid cylindrical component 35 does not move—wedge member 31 does the "sliding." Thus, wedge member 31, which accommodates rigid cylindrical component 35 in slot 33, can slide over component 35 from one rounded end 33a to distal rounded end 33b. FIG. 6b shows three-dimensional slot 33 and wedges 34a,34b formed thereby in wedge member 31. Each wedge has an apex 34c and a base 34d.

FIG. 6a shows peg member 30 inserted into wedge member 31, thus forming attachment 36 in the preferred embodiment. As noted supra, there are two sets of ridges 32a and 32b at either end of segment 32. Ridges 32a and valleys 32b can slide into and interlock with opposing ridges 27a and valleys 27b which are structurally part of the perimeters of depressions 10a.

Figure 7:
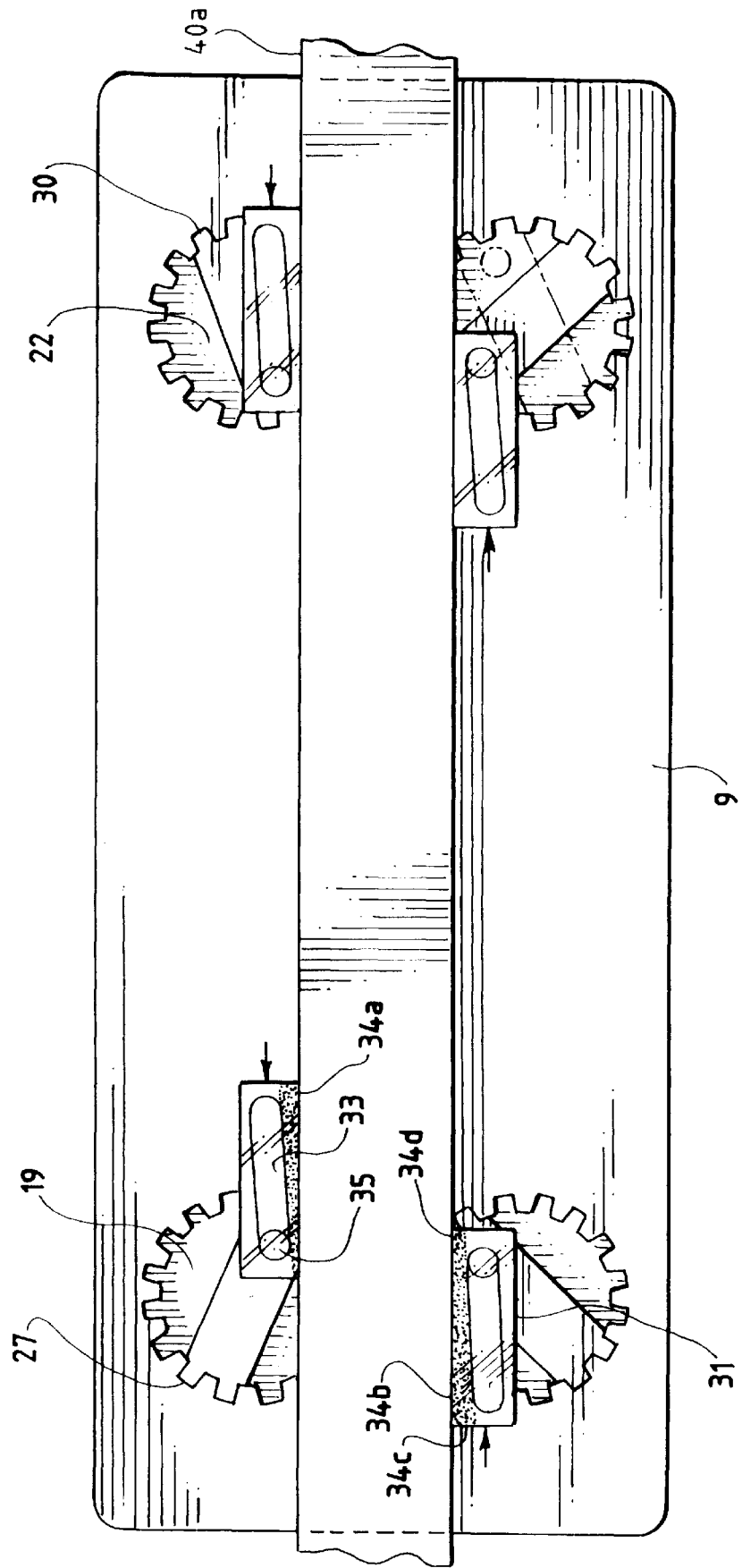
FIG. 7 is a plan view of the lower surface of planter box floor with attachments with interlocking ridges within serrated depressions.

FIG. 7 illustrates the preferred embodiment of lower surface 9 of the planter box 2 in plan view. Ridges 27a mechanically and frictionally interlock with ridges 32a or 32b of straight segment 32, now part of attachment 36 (not seen). Cylindrical component 35, snugly in slot 33, keeps wedge member 31 atop rectangular segment 32.

In the preferred embodiment, when planter box 2 is lifted, each peg member 30 fits tightly inside circular depressions, and each wedge member 31 fits tightly over peg member 30. In this manner, the two components (attachment 36) do not fall from lower surface 9, because of (i) frictionally fitting interlocking ridges and (ii) snugness of peg member 35 within slot 33.

Figure 8A:
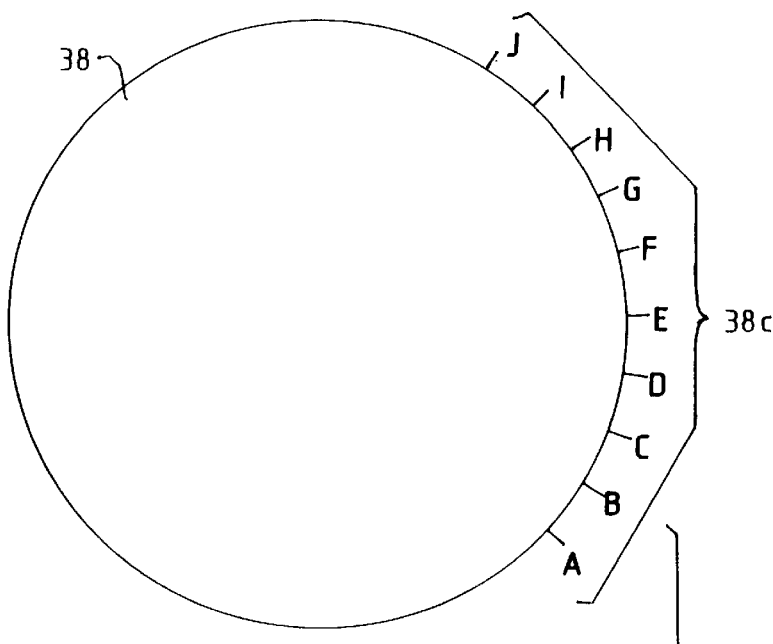
FIG. 8a shows a code of numbers and letters for opposing serrated depressions on either perimeter of opposing depressions.

FIG. 8a illustrates an optional variation comprising templates 37,38 for use on lower surface 9, as well as codes 37a and 37b thereon. These coded templates effect macroadjustment of attachments 36 to wall member 40a.

The coded templates 37,38 translate the width of a wall member 40a into the appropriate positions for interlocking of ridges 32a,32b within planter box ridges 27a. Insertion of attachments 36 at appropriate locations on lower surface 9 occurs by: (i) superimposing each template 37,38 over opposing serrated (ridges 27a and valleys 27b) depressions 10a; and (ii) manually interlocking ridges 32a,32b with ridges 27a by pressing ridges 32a,32b downward into depression 10a. Ridges 27a are coded with either a number or a letter, as seen in FIG. 8a.

Template 37,38 comprises a flat piece of paper comprising two circular apertures 37c, 38c. Templates can also be engraved upon surface 9 during the manufacturing process. Apertures 37c,37d are positioned on the paper so (i) they are congruent with a set of opposing depressions 10a on either side of lower surface 9; and (ii) there are depressions 10a simultaneously positioned on respective sides of wall member a. Aperture 37c or 38c has a number or letter for each corresponding ridge 27a of a depression 10a.

Figure 8B:
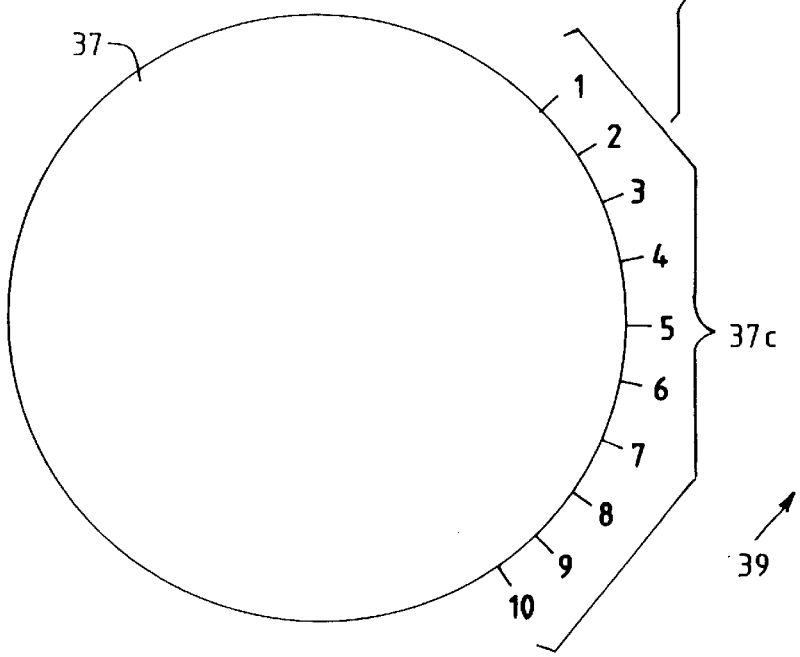
FIG. 8b is a chart correlating the width of a wall member with template codes designed for ridges within depressions.

FIG. 8b illustrates Table 39. In combination with templates 37,38, it correlates the width of wall member 40a to the proper orientation of interlocking ridges 32a,32b and ridges 27a. Template 37,38 are the result of experimentation. The letters and numbers refer to a particular ridge 27a on each paired circular depression. At a particular ridge 27a, peg member 30 fits a respective side of wall member 40a within one-eighth of an inch.

To initially secure planter box 2 to a panel using the template modification, cylindrical protruding component 35 is first manually placed into either end 33b or 33a to form attachment 36. Attachment 36 now has two sets of ridges 32a,32b on either side 35c,35d (from segment 32 of peg member 30).

Next, the width of wall member 40a is correlated with Table 39 in FIG. 8b. Insertion of attachments 36 at appropriate locations on either side of wall member 40a occurs by: (i) superimposing each template over opposing serrated (i.e., comprising ridges and valleys) depressions; and (ii) manually interlocking ridges 32a, 32b with ridges 27a by pressing ridges 32a,32b down into the depression (according to the templates and table). See FIG. 7. Instead of templates, the numbers, letters and configurations in FIGS. 8a, 8b, can be engraved on surface 9 of planter box 2.

For example, a wall member width of 3 and ¼ inches is code 7-G, according to Table 39. The operator first superimposes the template 38,37 over the appropriate depressions 10a. The operator next manually places one attachment 36 with ridges 32a,32b on either side of ridge 27a at position 7 of one depression 10a. For the opposing depression 10a the operator places second attachment 36 on either side of ridge 27a on the second opposing depression 10a.

A coding scheme for a different range of wall member measurements can be created as follows: First, two peg members 30 of a first and second attachment 36 are interlocked in equivalent positions in each of two opposing depressions. A good place to start is always the serrated (ridges 27a and valleys 27b) positions which gives the tightest fit on either side of wall member 40a. Please see FIG. 8c.

The operator manually superimposes template 37,38 over the appropriate surface and then places four (4) attachments 36 into the circular depressions. Two of these four attachments 36 are positioned with ridges 32a, 32b on either side of ridge 27a at position 7, and two are positioned with ridges 32a,32b on either side of ridge 27a at position G.

Next, a second linear measurement is taken between the two opposing apexes of wedges nearest wall member 40a. Here, 2/16 of an inch (or 1/8) is subtracted from the measurement to accommodate wedge apexes 34c. Next, approximately 1/4 inch (or 2/8 inch), is subtracted from the measurement to accommodate the bases 34d of wedges 34a or 34b nearest wall member 40a. These two numbers give the range of the partition width for these attachments 36 positions.

Next, the first attachment 36 is moved one ridge 27a further from respective sides of wall member 40a, or one ridge 27a from the site of the first measurement, as described above. The second attachment 36 remains at the site of the first measurement. Another linear measurement is taken, this time between the second site and the first site.

Again the measurements are first taken between innermost apexes with 1/8 inch subtracted and then between wedge bases with 1/4 inch subtracted. For the width of wall member 40a at these particular coded ridges 27a, there is again a range of values between the number with 1/4 inch subtracted and the number with 1/8 subtracted.

This procedure is repeated, now with the second attachment 36 held in the same position and a measurement taken as in the preceding description. Measurements are taken in alternating sequence, i.e., first attachment 36 is moved further one ridge while the second attachment 36 remains where it was. Then the second attachment is moved while the first attachment 36 remains.

It is important that each ridge 27a in each opposing depression have a code designation; in the preferred embodiment, depending upon the depression it will either consistently be a number or a letter. However, many users do not use this method at all, preferring to find the correct positions for attachments 36 for a wall member 40a by empirical trial and error.

The above discussion describes macroadjustment which brings attachments 36 within approximately one-eighth of an inch or less from each side of wall member 40a. Experimentation has shown that when attachment 36 is tightened, ridges 32a, 32b have a tendency to be forced from circular depressions 10a. Therefore, in the preferred embodiment, the depth of the circular depressions 10a in lower surface 9 is approximately 3/4 inch for increased interlocking support.

As seen in FIG. 7, in the preferred embodiment, a tighter microfit originates from wedges 34a or 34b of at least one attachment 36. This occurs after attachment 36 is interlocked within lower surface 9 by ridges 32a,32b and 27a,27b. Microadjustment is accomplished as follows: Each wedge 34a or 34b increases three-dimensionally in volume as it passes a specific point along wall member 40a, if wedge 43a or 43b is pushed forward from apex to base. See FIG. 8(c) and FIG. 7.

In the preferred embodiment one manually pushes wedge member 31 along cylindrical component 35 within slot 33. Again referring to FIG. 7, as wedge member 31 is pushed along peg member 30, wedge 34a,34d volume and width, moving from apex to base, and proceeding along side wall member 40a, becomes increasingly greater. Eventually wedge member 31 abuts tightly against wall member 40a. Moreover, when two wedge members 31 are pushed from opposing directions, balancing forces are generated by the juxtaposed wedges 34a,34b. See FIG. 8c and FIG. 7. In fact, it may only be necessary to tighten one attachment 36 if another such attachment 36 is already abutting one respective side of wall member 40a.

When these juxtaposed wedges 34a,43b approach from opposite directions, moving from apex to base, the result is a firm grip of attachment 36 to partition 40a.

In sum, the preferred embodiment comprises modified planter box 2 and novel attachments 36 for gripping respective sides of wall member 40a. In the preferred embodiment wedge members 31 comprising wedges 34a,34b are easy to manually push. Moreover, each wedge member 31 is easily decorated. The prototype is relatively easy to hot stamp, a process well known to those skilled in the art of producing plastic objects.

Also in the preferred embodiment, the plastic attachments are also more aesthetically pleasing than mere wedge-shaped objects. Nevertheless, in a variation of this embodiment, a wedge member 31 shaped as a three dimensional semi-circle is also within the scope of my invention.

The rectangular or semi-circular prototypes are both relatively easy to hot stamp. Other attachment shapes are also within the scope of my invention. The requirements for all variations of this preferred embodiment are: (i) an angled slot which fits a protruding rigid component through which the wedge member can slide linearly; and (ii) at least one wedge integrally part of wedge member 31 which tightly abuts against a narrow horizontal supporting surface of box 2 if pushed in a direction from apex to base. See FIG. 7.

Figure 8C:
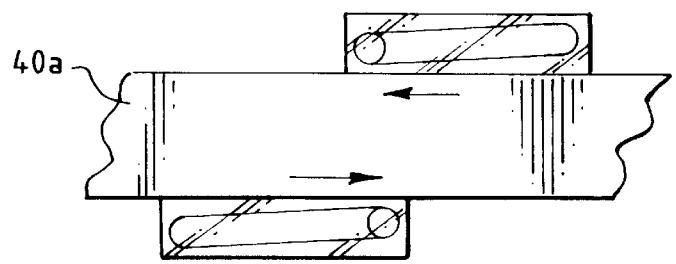
FIG. 8c is a diagrammatic upper plan view of two attachments moving in opposing directions along respective sides of a wall member.

In the preferred embodiment each wedge member 31 is unidirectional, because only one wedge 34a or 34b is physically oriented to slide from its apex to its base against wall member 40a. See FIG. 7. As such, a wedge member 31 with an integral bottom 31a can create only one opposing force, as seen in FIG. 8c.

Rectangular Depression Embodiments

Referring now to FIG. 9, there are two rectangular depressions 38a and 38b (generically 38) at each short parallel end 38d, 38c of bottom surface 9. Depressions 38a and 38b are recessed within bottom surface 9 at right angles to the midline long axis 40b of planter box 2. There are serrations 29 (ridges 29a and valleys 29b) which comprise the perimeters of rectangular depressions 38a and 38b.

In this second embodiment ridges 29a and valleys 29b may be the same configuration, shape and size, and at the same angle to the horizontal bottom surface 9, as serrations 27 in the first preferred embodiment, discussed supra. However, the dimensions and angle from surface 9 need not be the same to stay within the scope of my invention 1.

The scope of my invention includes rectangular depressions of different dimensions and depths. Serrations 29 can be of different sizes, shapes, or dimensions and angle from surface 9. Depressions can also be of other shapes.

In my second embodiment, rectangular depressions 38 can also themselves be at an angle from the horizontal longitudinal planter box midline 40b, other than a 90 degree angle. For the rectangle approach, the depth of depressions 38a,38b may be the same as those of the preferred embodiment; however, this exact depth is not a requirement of my invention 1. Dimensions of the preferred embodiment such as those of planter box 2, as well as the materials comprising the invention, can also be those of the rectangular embodiments. However, other construction materials and dimensions are also within the scope of my invention.

Referring to FIG. 10, in the second embodiment one observes a peg-base 44, corresponding in function to peg member 30 in the preferred embodiment. A rigid protruding component, (peg means 45) is fused to upper surface 47a of lower rigid base means 47 In FIG. 10, peg means 10 meets surface 47*a* at a right angle to form a relatively short narrow peg-base 44.

In this discussion, width always refers to distance from one serrated edge to the other; length always refers to the distance from one unserrated edge to a parallel unserrated edge. Thus, the length may be considerably less than the width (as in FIG. 15). The minimum length, for purposes of structural strength, should be no less than the diameter of peg means 45.

The dimensions of base means 47 are approximately 0.5 inch in length by 0.75 inch in width by 0.75 inch in depth. A wide base means 47 which is approximately three (3.0) inches in width and ½ inch in length is also acceptable.

Again referring to FIG. 10, base means 47 has two opposing parallel flat sides 47*b* and 47*c*. Base means 47 also comprises ridges 48*a* and valleys 48*b* (serrations 48). Macroadjustment is basically the same as that in the preferred embodiment: peg-base 44 interlocks ridges 48*a* and valleys 48*b* with serrations 29 along the perimeters of rectangular depressions 38*a*,38*b*.

FIG. 11 is a partial perspective plan view demonstrating the ridges 29*a* and valleys 29*b* comprising the perimeter of a rectangular depression(generically rectangular depression 38). Wedge member 31*a* is not shown in FIGS. 9, 10,11 or 12. However, wedge member 31*a* can be identical with the structure and dimensions of wedge member 31 of the preferred embodiment, if it is physically compatible with depression 38 and peg-base 44.

FIG. 12 illustrates peg-base 44 in plan view of bottom surface 9, with peg means 45 at center 69 of base 47. Depressions 38*a*,38*b* have their longitudinal sides 57*a*,57*b* at right angles to midline 40*b* of planter box 2. This orientation allows peg means 45 to move towards or away from midline 40*b* of planter box 2. This orientation also satisfies an adjustability requirement for my invention 1.

As illustrated in FIG. 14 in partial perspective view, peg-base 44 can be a relatively short narrow structure. Its advantage is that it can be easily manually lifted from interlocking serations and reinserted in a different depression location, as indicated by arrow C-1. As seen schematically in FIG. 13, in plan view wedge member 31*a* and peg-base 44 comprise attachment device 55 for the embodiment with rectangular depressions 38*a*,38*b*.

Wedge member 31*a*, as in the preferred embodiment, receives peg means 45 into slot 33 for slidable mobility. It can also comprise a slot 33*g* which opens outwardly towards the bottom as well as the top. This feature of openings towards both top and bottom give wedge member 31,31*a*, the ability to slide from left to right as well as right to left. Please see FIGS. 14*a*, 14*b* (arrow B1).

The interlocking of ridges and valleys—48*a*,48*b* on peg-base 44—with serrations 29 (generically ridges 29*a*, and valleys 29*b*) within rectangular depressions 38*a*,38*b*, creates the required frictional fit. However, other frictional means of fitting peg-base 44 or similar devices to surface 9 are also within the scope of my first preferred embodiment as well as subsequent embodiments.

Figure 15:
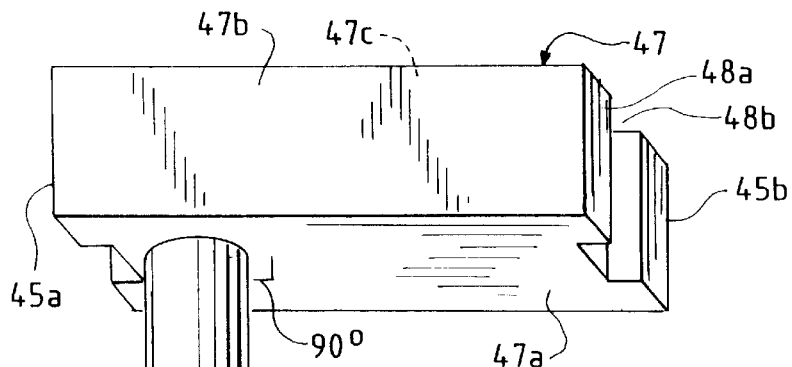
FIG. 15 illustrates a peg-base with a relatively greater width.
Figure 16:
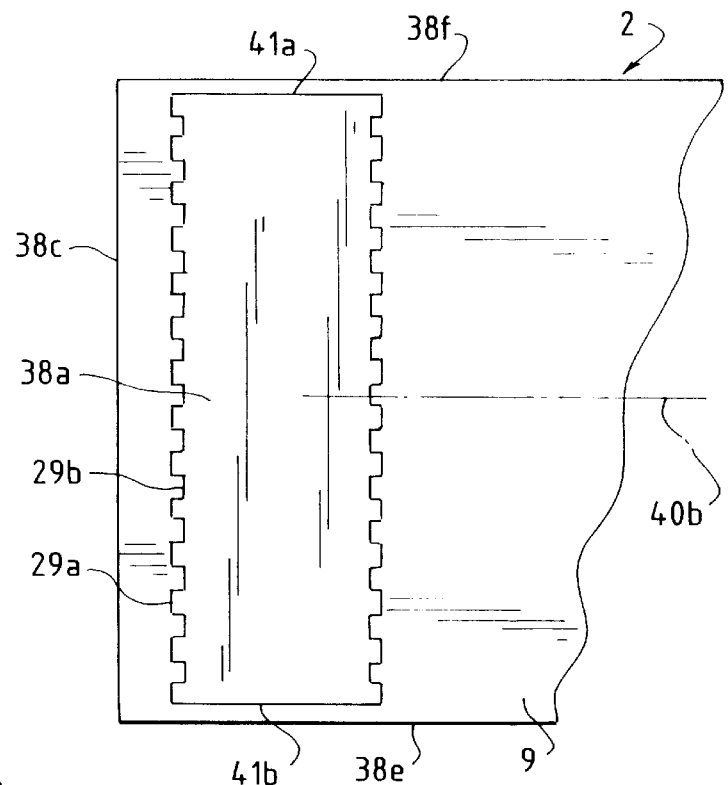
FIG. 16 illustrates a plan view of an entire serrated rectangular depression with alternating ridges and valleys located in the planter bottom surface.

FIG. 15 illustrates peg means 45 fused to a relatively wider serrated base means 47. As illustrated in FIG. 16 in the second embodiment this peg-base 44 requires a relatively wider serrated rectangular depression 38. Peg means 45 is positioned upon one end 45*a*,45*b* of base means 47. Peg means 44 gains strength from the interlocking of serrations to counteract the pressure generated by wedge member 31*a* when it forced between peg means 45 and a side of wall member 40*a*.

Figure 17:
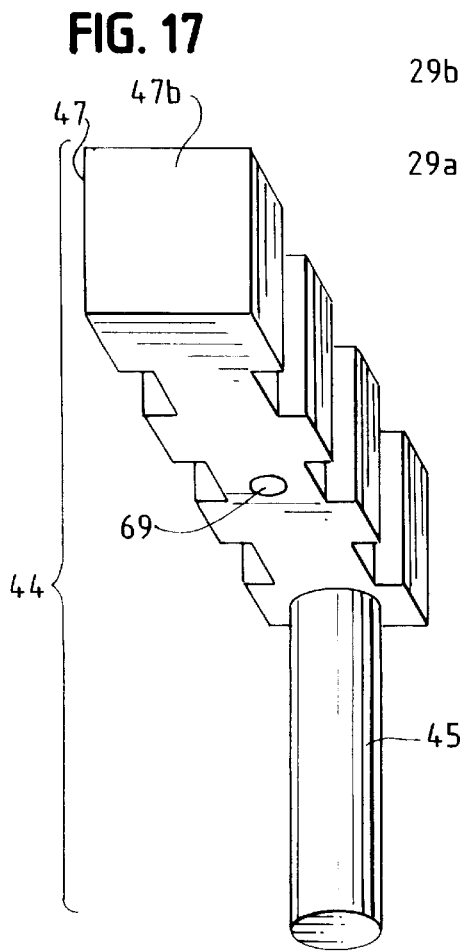
FIG. 17 illustrates a front partial perspective view of a peg-base with an elongated serrated base means.

As seen in FIG. 17, in another rectangular embodiment of my invention, peg means 45 is fused to a relatively longer narrower base means 47. Elongated peg-base 44 is always sufficiently strong to withstand pressure of sliding wedge member 31*a* because peg means 45 is always adjacent to interlocking serrations. Nevertheless, it is preferable to position peg means 45 at one end 45*a*,45*b* of base means 47, as seen in FIG. 15. The position of peg means 45 on base means 47 is important for two reasons: (i) peg means 45 should be located at either serrated edge of base means 47 to gain strength from interlocking serrations 48 with serrations 29; (2) peg means 45 should be located at an unserrated edge of base means 47 to avoid blind spot problems.

FIG. 20 illustrates the result when peg means 45 is fused at right angles to the center of base means 47. Here, peg means 45 are hindered by their base means 47 from a sufficiently close adjustment toward planter midline 40*b* for a narrower wall member 40*a*. There is a similar problem with rectangular depressions 38 for wider wall members 40*a*.

As seen in FIG. 14*b*, when wedge member 31*a* moves between peg means 45 and partition 40*a*, considerable lateral force is exerted upon peg means 45 (arrow A). Increased interlocking of serrations 29 with serrations 48 of an elongated base means 47 lends lateral strength to peg means 45. In other words, serrations 48*a*,48*b* on peg-base 44, when interlocked with serrations 29 of rectangular depression 38, give adequate strength to resist lateral pressure from wedge member 31*a* along respective sides of wall member 40*a*.

Figure 17A:
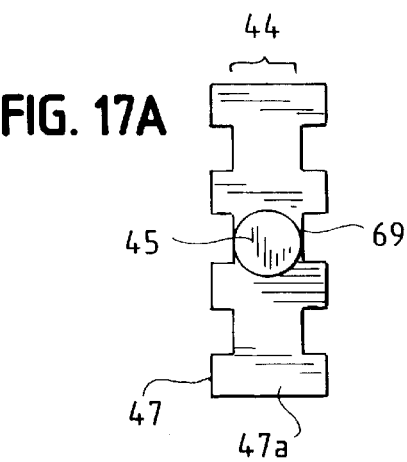
FIG. 17a illustrates a peg-base with a peg means located in the center of the elongated base means.

FIGS. 17 and 17*a* illustrate peg means 45 on a relatively long narrow base means 47. This particular peg means 45 inserts into rectangular depressions 38*a*,38*b*, which are approximately 3.5 inches wide (three and one-half inches). In FIG. 17 the additional length of the base means 47 allows additional interlocking between serrations 29 and 48.

Blind spots 66 occur in rectangular depressions 38 where peg means 45 can never be physically located to macrofit. If only one rectangular depression 38 is located at each end 38*c*,38*d* of surface 9, and peg means 45 is fused to center 69 within each base means 47, then blind spots will occur. There are also certain limitations on base means 47 length which compete with the positive effect of interlocking strength.

Figure 18A:
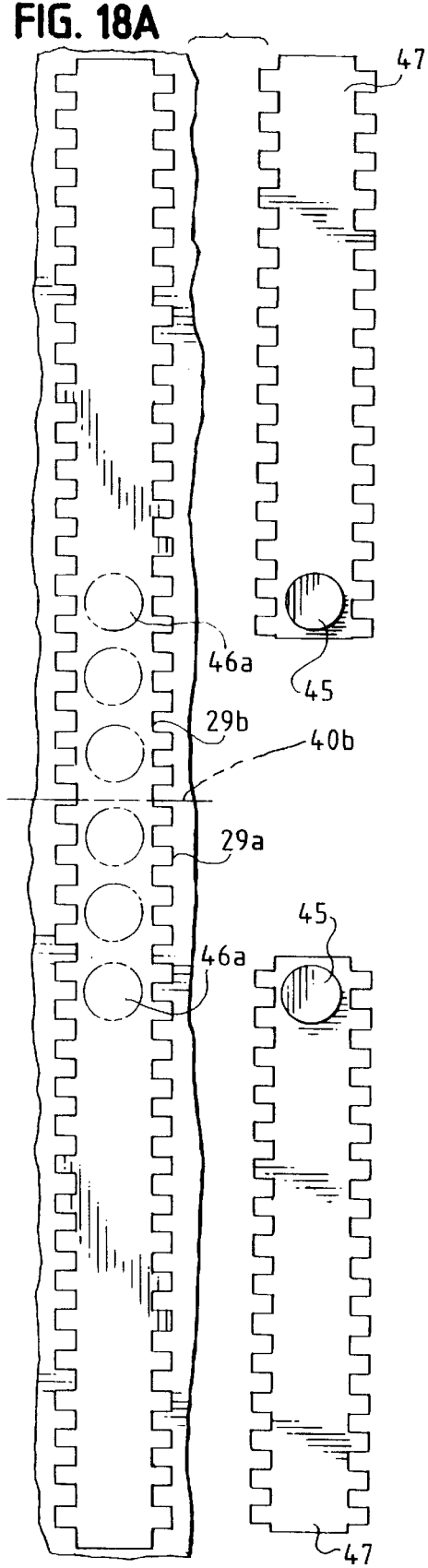
FIGS. 18a,b,c diagrammatically illustrate blind spots in plan view.
Figure 18B:
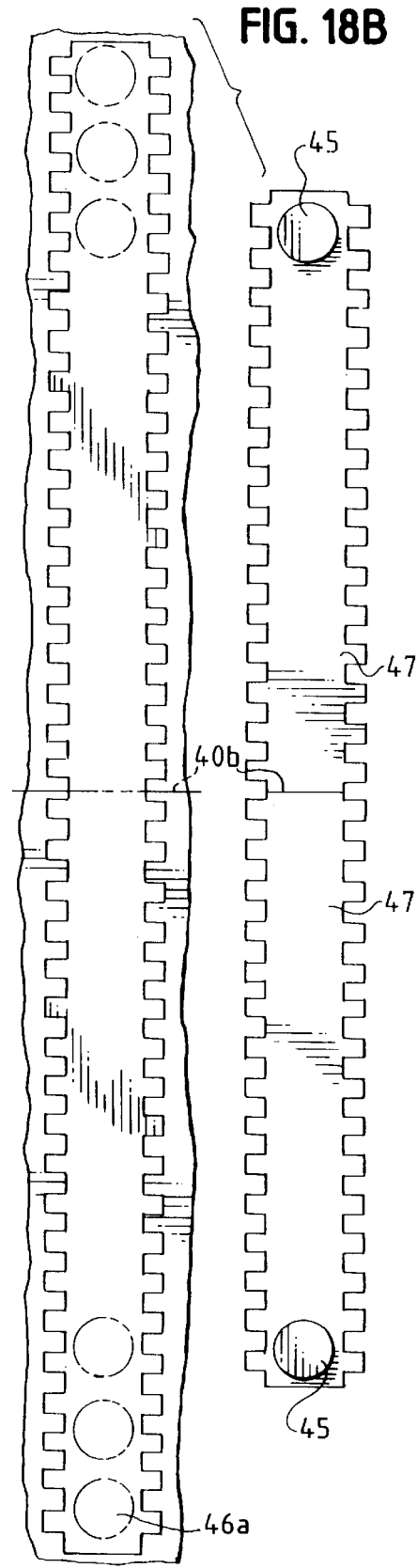

FIG. 18A illustrates peg means 45 approaching midline 40*b* of box 2. FIG. 18B illustrates how close peg means 45 can approach the exterior of surface 9. Peg means 45 should always be at one end 45*a*,45*b*, of base means 47. If base means 47 is too long, as shown in FIGS. 18A and 18B, there will be blind spots 66, as seen in FIG. 18*c* (represented by unshaded circles 46*a*).

Figure 18C:
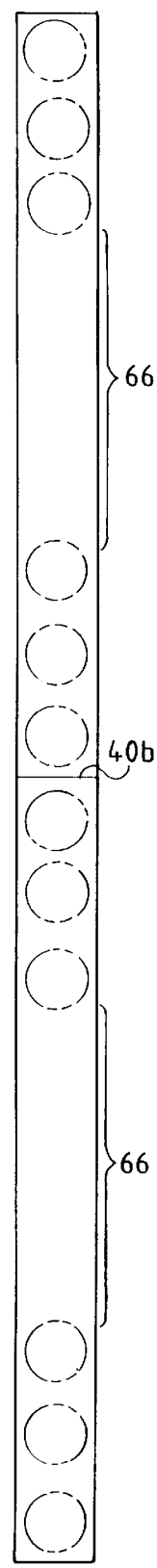

FIGS. 18A, 18B, 18C, represent the same single rectangular depression 38 with respect to dimensions and depth. The unshaded circles 46*a* represent possible peg means 45 positions, which in turn depend upon the number and size of serrations 29. Because of size differences of serrations, depressions or peg-means, there may be more or fewer peg means 45 positions.

As illustrated in FIG. 18A, base means 47 in the above embodiment are of such a length that each peg-base 44 can only be moved two or three serrations 29 (ridges 29*a* and valleys 29*b*) towards midline 40*b*. In FIG. 18B, the same rectangular depression has peg-bases 44 oriented toward the exterior of planter box 2 to accommodate a wider partition 40A. Base means 47 cannot move more than two or three serrations 29.

FIG. 18c is a compilation of possible peg means 45 positions as shown in FIGS. 18A and 18B. FIG. 18C illustrates the remaining positions ('blind spots') in which peg means 45 physically cannot be inserted.

There is a solution to creation of blind spots 66. As illustrated in FIG. 19, instead of two rectangular depressions 38a, 38b of surface 9, there are two parallel pairs of serrated rectangular depressions 38a, 38aa, 38b, 38bb, at each parallel end 38c,38d (not seen). In this embodiment, there is one peg-base 44 per rectangular depression 38, but four depressions instead of two.

Each single peg-base 44 in each rectangular depression of pairs 38a,38aa,38b,38bb, can move as close to midline 40b as is necessary. For a wider wall member 40a one peg base 44 in each in rectangular depression 38b, 38bb, can move as close to the edge 38e,38f of surface 9 as is necessary. More positions are possible because in each pair one peg means 45 can move the entire length of one rectangular depression and be compensated by the corresponding member of the pair, such as 38a,38aa.

The result overall is two separate but parallel paired depressions 38a,38aa and 38b,38bb with peg-bases 44 capable of complete inward/outward movement, as shown in FIG. 19.

Another solution to blind spots 66 is a single rectangular depression 38a or 38b approximately six (6) inches long at each end 38c,38d, but with a shorter peg-base 44. In general, a base means 47 which is approximately 0.25 (one quarter) the length of a specific rectangular depression 38 is optimal. A base means which is less than approximately 0.25 is also acceptable, but more than 0.25 is not. For example, an operator can use two shorter narrower base means 47, approximately ¾ (three quarters) inch in length, in each rectangular depression 38. With two such peg-bases 44 in one rectangular depression 38, each peg means 45 can be positioned so they either contact at wall member 40a, or position at ends of rectangular depression 38.

Figure 25A:
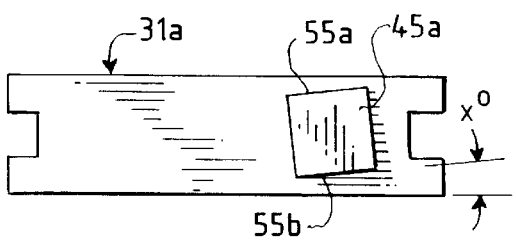
FIGS. 25a, 25b illustate movements of peg-bases in fully serrated rectangular depressions.
Figure 25B:
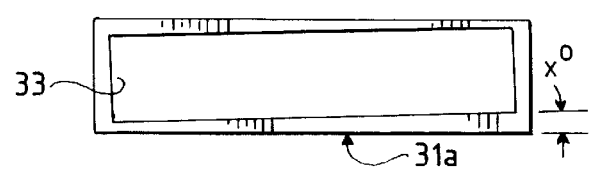

FIGS. 25A and 25B illustrate the above embodiment with two rectangular depressions 38a,38b. There are two relatively short narrow peg-bases 44 in each respective rectangular depression 38. In these examples, base means 47 are no more than 0.25 the total length of rectangular depresion 38a,38b, as specified supra. Narrow as well as wider wall members 40a have maximum adjustability with this approach.

In sum, for rectangular depressions with two sides serrated, as base means 47 length increases beyond 0.25 of total depression length at right angles to midline 40b, blind spot area increases. As base means 47 length decreases to less than 0.25 of this length, blind spot area decreases. Peg means 45 are adjustable towards (i) midline 40b to accommodate narrower wall member (FIG. 25a); or (ii) toward ends 38e,38f of surface 9 to accommodate a wider wall member 40a (FIG. 25B).

FIGS. 21, 22, 23a and 23b illustrate another embodiment of the rectangular series. There is a peg means 44 on an elongated base 47 with serrations 48 on a single longitudinal side. In this embodiment, rectangular depressions 38 will also have serrations 29 (ridges 29a and valleys 29b) on a single corresponding longitudinal perimeter segment. These rectangular depressions 38 are parallel to edges 38d and 38c of surface 9 as well as to each other, and at right angles to midline 40b.

These serrations 48 are only on one longitudinal side of base means 47. In this embodiment depressions 38a,38b have serrations 29a,29b on a single congruent side (ie., one longitudinal side with serrations). This approach is operable because interlocking serrations on one side of a peg base 44 and corresponding depression 38 provide sufficient adjustability and frictional hold.

Relative narrowness of peg-base 44 and corresponding depressions 38 is necessary to provide adequate friction.

FIG. 22 illustrates the problem with a single rectangular depression 38 containing two peg-bases 44. It is impossible because of the one sided structure to rotate it one hundred and eighty degrees and reinsert peg-base 44 in the correct position. One peg means 45 (J) can be brought closer to the box exterior, but second peg means 45(H) can never sufficiently approach exterior 37e,37f. Convesely H can be brought closer to midline 40b, but J cannot be turned 180 degrees to bring H closer to midline 40b.

Figure 23A:
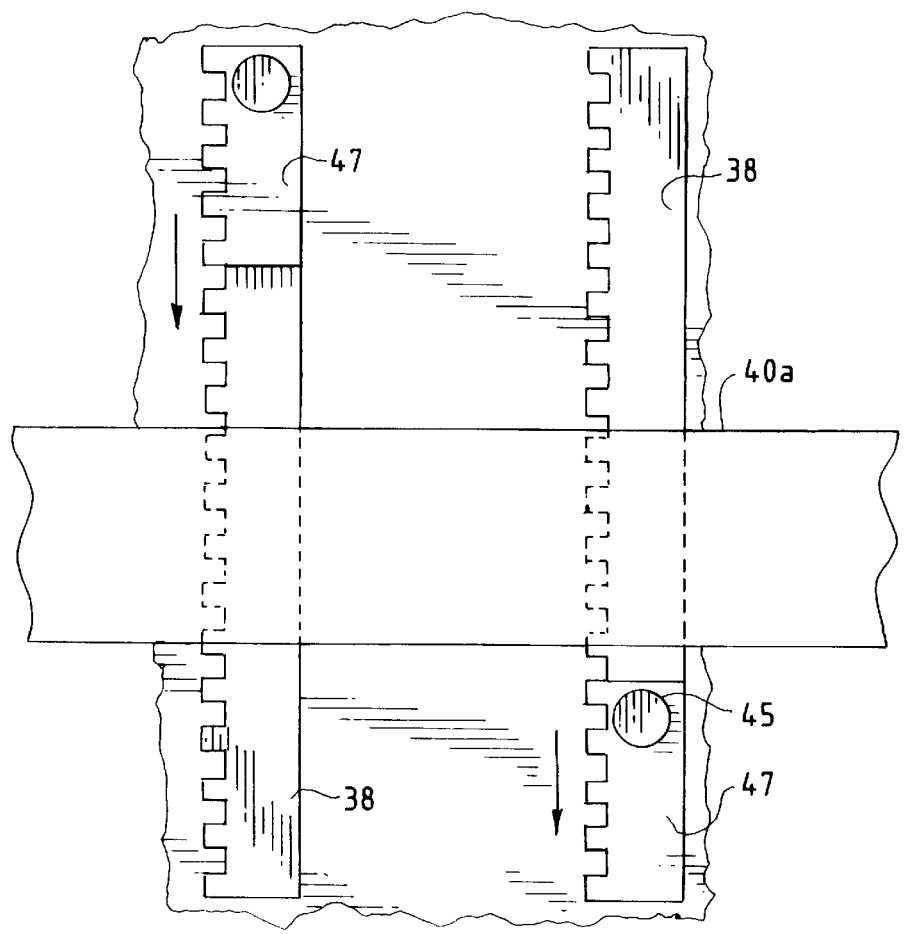
FIG. 23a illustrates a plan view of two adjacent depressions, each containing a peg-base with serrations on one side only for a wide wall member.

The solution as illustrated in FIG. 23A and FIG. 23B, is a pair of rectangular depressions such as 38a, 38aa, or 38b, 38bb (not seen) each containing a one-sided serration base means 47. When rectangular depressions 38 are parallel and adjacent to each other at ends 38d and 37c, peg-bases 44 with one longitudinal serrated side can adapt to any horizontal width of wall member 40a.

Serrations 29 on rectangular depression 38 in FIG. 23 must be on opposite opposing parallel sides to prevent the problems discussed with the FIG. 22 prototype. As seen in FIGS. 23A and 23B, with a pair of rectangular depressions at each end 38d,38c of surface 9, peg means 45 can sufficiently approach midline 40b for a narrow wall member 40a, or 38e,38f, for a wider wall member 40a.

Figure 24:
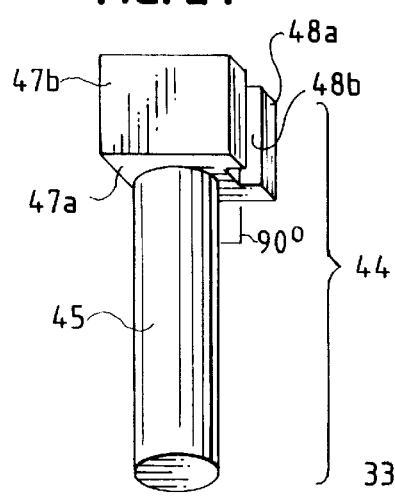
FIG. 24 illustrates a peg-base which a shortened base means in partial front perspective view, and with serrations on one side only.

A short peg-base 44, shown in FIG. 24, is also acceptable and solves the problem of 180 degree reversibility. The narrowness of peg-base 44, together with a narrow dimension for rectangular depressions 38 (approximately ⅝ inch), reduce lateral forces caused by wedge member 31a when pushed between peg means 45 and wall member 40a.

The means for producing my planter boxes, attachments and attachment devices, as discussed in the parent application, are well known to those skilled in the art of molding plastic to make a variety of useful articles. My invention is quickly produced at an economical cost and can be decorated to a purchaser's taste.

CONCLUSIONS

My invention is economical and poses endless variations, only a few of which has been specifically described herein. The vertical serrations 27,29 in depressions 10a,38 on surface 9 with the corresponding serrations on attachment devices serve two purposes:

(i) to permit peg-base 44 or attachments 36 to move towards or away from the planter box midline to accommodate different wall member widths; and (ii) to create a frictionally based reliable fit.

Other designs or structures of serrated depressions 10a,38 with corresponding frictionally cooperating components also satisfy these requirements of my invention.

What is claimed is:

1. A panel planter adapted to rest upon a horizontal surface of a wall member, said wall member comprising two respective sides, said panel planter comprising: a box with a lower surface and first, second, third, and fourth sides, wherein said lower surface of said planter box comprises a first end and a second end parallel to each other and separated by a length, said length having a midline, each said end further comprising:

(A) at least one rectangular depression, each said depression at right angles to said length of said planter box, each depression parallel to said first end and said second end, each said depression further comprising
  (1) serrations, said serrations comprising ridges and valleys at right angles to said lower surface,
  (2) said ridges and valleys extending from said lower surface and opening outwardly from said lower surface;
(B) four peg-bases, two of said peg-bases associated with said at least one depression at the first end, and the remaining two of said peg-bases associated with said at least one depression at the second end; said peg-bases each comprising
  (1) a peg means, each said peg means comprising a protruding member,
  (2) a base means, each said base means comprising a surface, said peg means fused to said surface of said base means, each said base means comprising two sets of parallel sides, at least one side comprising ridges and valleys, said ridges and valleys frictionally engaged into said ridges and valleys of its associated said at least one depression, such that each said at least one depression on each side of the lower surface is provided with two peg-bases engaged therein, each peg-base with a peg means protruding downwardly therefrom, for a total of two peg means protruding downwardly from each end of the lower surface, the two peg means of the at least one depression associated with each side being separated by a distance greater than the width of said wall member;
(C) at least two wedge members, each said wedge member comprising a slot, each said slot connecting to a peg-base by a peg means inserting into said slot, each said wedge member comprising at least one flat surface which abuts a said side of said wall member, said slot having a first end and a second end, said first end being closer to said flat surface than said second end,
  whereby a wedge member is initially engaged with a respective peg means so that said peg means is located in the end of the slot closer to said flat surface and the flat surface is located a distance from said wall member, and said wedge member may be slid along the lower member toward the other end of the slot, causing the wedge member flat surface to contact said wall member and frictionally hold said planter box in place.

2. A planter box as described in claim 1 wherein said wedge member has a top surface and a bottom surface, and said slot opening outwardly through said top surface and said bottom surface.

3. The panel planter as described in claim 1, wherein
(A) said lower surface is approximately 0.15 inch in thickness,
(B) each said ridge and each said valley of each said depression being approximately one-tenth inch in width,
(C) each said ridge and each said valley of each said peg-base is approximately one-tenth inch in width,
(D) each said first, second, third and fourth sides of said planter box being approximately seven inches in height,
(E) each said depression in said lower surface being rectangular in shape.

4. The panel planter as described in claim 3 where there are two rectangular depressions, and each said rectangular depression contains two peg-bases.

5. The panel planter as described in claim 3 wherein each rectangular depression has a longer length and a shorter width, said longer length being parallel to said first and second ends of said planter box, said length of each said rectangular depression being approximately three inches.

6. The panel planter as described in claim 5 wherein said shorter width of each said rectangular depression is approximately three quarters of an inch.

7. The panel planter as described in claim 6 said lower surface comprising two pairs of parallel said rectangular depressions, each said pair positioned at each said first and second end respectively, each said parallel rectangular depression aligned parallel to said first end and said second end by their respective longer lengths.

8. The panel planter as described in claim 6 wherein each said base means comprises no less than three and no more than four said ridges on each of its respective said parallel sides.

9. The panel planter as described in claim 1 wherein
(i) each said base means comprises a bottom surface with a width and a length,
(ii) the length of said base means being parallel to said depression, and
(iii) the length of said base means being approximately one-quarter of the length of each said rectangular depression, into which said base means frictionally associates.

10. The panel planter as described in claim 1 wherein each said peg means consists of clarified styrene acrylonitrile copolymer.

11. The panel planter as described in claim 1 wherein each said wedge member consists of styrene-butadiene.

12. The panel planter as described in claim 1 wherein each said base means comprises no less than five said ridges and five said valleys one said respective parallel side.

13. The panel planter as described in claim 1 said surface of said base means comprising a first end and a second end, wherein said peg means is fused at a ninety degree angle to said first end of said surface.

14. The panel planter as described in claim 1 wherein each said peg-base comprises ridges and valleys on only one said side.

* * * * *

UNITED STATES PATENT AND TRADEMARK OFFICE
CERTIFICATE OF CORRECTION

PATENT NO. : 6,108,971
APPLICATION NO. : 09/196704
DATED : August 29, 2000
INVENTOR(S) : Zaremba It is certified that error appears in the above-identified patent and that said Letters Patent is hereby corrected as shown below:

Delete the following from column 5, lines 53-55 in the above captioned patent:

Its physical properties are listed in Exhibit B attached hereto and made an integral portion of this specification herein.

Insert the following sentence at column 5, line 53 in the above captioned patent:

Physical properties are listed with the manufacturer for Zytel® nylon resins (styrene-butadiene) and are incorporated by reference into this specification. Physical properties of styrene acrylonitrile copolymer (Tyril® 100) are available from the manufacturer and are incorporated by reference into this specification.

Signed and Sealed this

Twenty-sixth Day of August, 2008

JON W. DUDAS
*Director of the United States Patent and Trademark Office*